United States Patent [19]

Horner

[11] 4,372,677
[45] Feb. 8, 1983

[54] PRECISION PLANAR POSITIONING DEVICE

[75] Inventor: Ellwood J. Horner, Armonk, N.Y.

[73] Assignee: American Hoechst Corporation, Somerville, N.Y.

[21] Appl. No.: 323,791

[22] Filed: Nov. 23, 1981

[51] Int. Cl.³ .................. G03B 27/52; G03B 27/04
[52] U.S. Cl. .......................................... 355/41; 354/4; 355/54; 355/86; 355/95
[58] Field of Search ............... 355/87, 95, 94, 99, 355/86, 102, 40, 41, 53, 54; 354/4; 250/215, 561, 571, 224

[56] References Cited

U.S. PATENT DOCUMENTS

| 3,052,174 | 9/1962 | Berger | 355/95 |
| 3,147,683 | 9/1964 | Hulen | 355/87 |
| 3,150,582 | 9/1964 | Gerson | 355/87 |
| 3,484,166 | 12/1969 | Gerson | 355/95 |
| 3,586,437 | 6/1971 | Dietz et al. | 355/53 X |
| 3,639,056 | 2/1972 | Gerson | 355/40 |
| 3,752,578 | 8/1973 | Allan | 355/53 X |
| 3,873,202 | 3/1975 | Inoue | 355/95 X |
| 3,905,699 | 9/1975 | Szabo | 355/54 X |

OTHER PUBLICATIONS

TRW Optron Product Bulletins, Nos. 103, 112, 1084 and 2047.

Primary Examiner—Richard A. Wintercorn
Attorney, Agent, or Firm—Richard S. Roberts

[57] ABSTRACT

A device for the precision positioning of substantially planar materials, especially for use in the lithographic arts. In particular, photographic masks are precisely located for superimposition on photosensitive films or lithographic printing plates held within the frame of a plate making machine.

6 Claims, 6 Drawing Figures

PRECISION PLANAR POSITIONING DEVICE

BACKGROUND OF THE INVENTION

The present invention relates to devices capable of precisely positioning materials on a substantially planar coordinate platen. More particularly, the invention relates to means for precisely superimposing photographic masks on a photosensitive film or lithographic printing plate which is retained within the frame of a plate making machine.

In the photolithographic process, it is frequently desirable to have multiple images in spaced and predetermined positions on the photographic plate, which images are obtained by repeated exposure. Certain economies result from the production of a number of identical reproductions from a single plate impression, and in color work, the number of impressions is equal to the number of colors required. In order to reproduce work of highly acceptable quality, it is necessary that the various color impressions be exactly superimposed. To this end, it is necessary that the negatives, positive flats or photographic masks use to expose the photolithographic plate be in precise register and proper contact. While devices of this general character are known, because of the extremely accurate machine work required in the fabrication thereof, and the large bulk and weight involved, such devices are relatively costly, and the use thereof is consequently restricted. In addition, the systems employed in prior art machines are complicated and require considerable training before the operator is capable of reproducing satisfactory work.

U.S. Pat. Nos. 3,150,582; 3,484,166 and 3,639,056 which are incorporated herein by reference, describe devices which support a negative carrier in such manner that it may be moved in a plane over the face of a support for the lithographic film or plate, and be locked in proper location in any one of a plurality of positions whereby successive exposures may be made.

While the above-mentioned means are extremely useful, nevertheless, where a plurality of lithographic films or plates are exposed, it is still necessary to precisely align the negative carrier each time the negative carrier is moved to a new location. The locating of the negative carrier must be determined by reference to a scale, first with respect to a horizontal position, and secondly with respect to a vertical position. This has been time-consuming.

For example, as in U.S. Pat. No. 3,639,056, a negative carrier is moved along a plate carrying frame by means of a toothed rack along a part of the perimeter of the frame. The position of the carrier is marked by means of a series of electrical contact clips or keys mounted on a second rack parallel with the rack bearing the negative carrier. When the carrier is properly aligned an electrical connection is made between the carrier and the contact clip so as to illuminate an indicator light.

This method is disadvantageous for several reasons. First, the contact clips are costly to manufacture. Second, the clips are usually repositioned for each job and much machine and operator time is wasted during this set-up operation. The clips must be individually repositioned.

The present invention improves upon this arrangement by replacing the clip carrying racks with either transparent strips having opaque indicia or opaque strips having punched holes, at the sites of horizontal or vertical positioning. The strips are positioned in the groove of an optical interruptor fixed to the negative carrier transport mechanism. When one of the indicia is positioned in the groove, the interruptor activates an indicating circuit. The strips are quickly interchangeable and may be prepared while they are off the plate making machine.

SUMMARY OF THE INVENTION

The present invention relates to a device for precision planar positioning which comprises:

(a) a generally planar frame; and
(b) a cursor; and
(c) means for translating said cursor across the face of said planar frame and fixing said cursor at any of a plurality of positions; and
(d) a planar indicator strip removably fixed along each of two adjacent perpendicular edges of said frame, each strip bearing at least one facial indicia having a substantially different optical density from said strip; and
(e) at least one optical interruptor means, cooperating with said translating means, capable of differentiating between the optical density of said strips and said indicia and having means for indicating a difference in optical density between said strips and said indicia.

DETAILED DESCRIPTION OF THE PREFERRED EMBODIMENT

Figure 1:
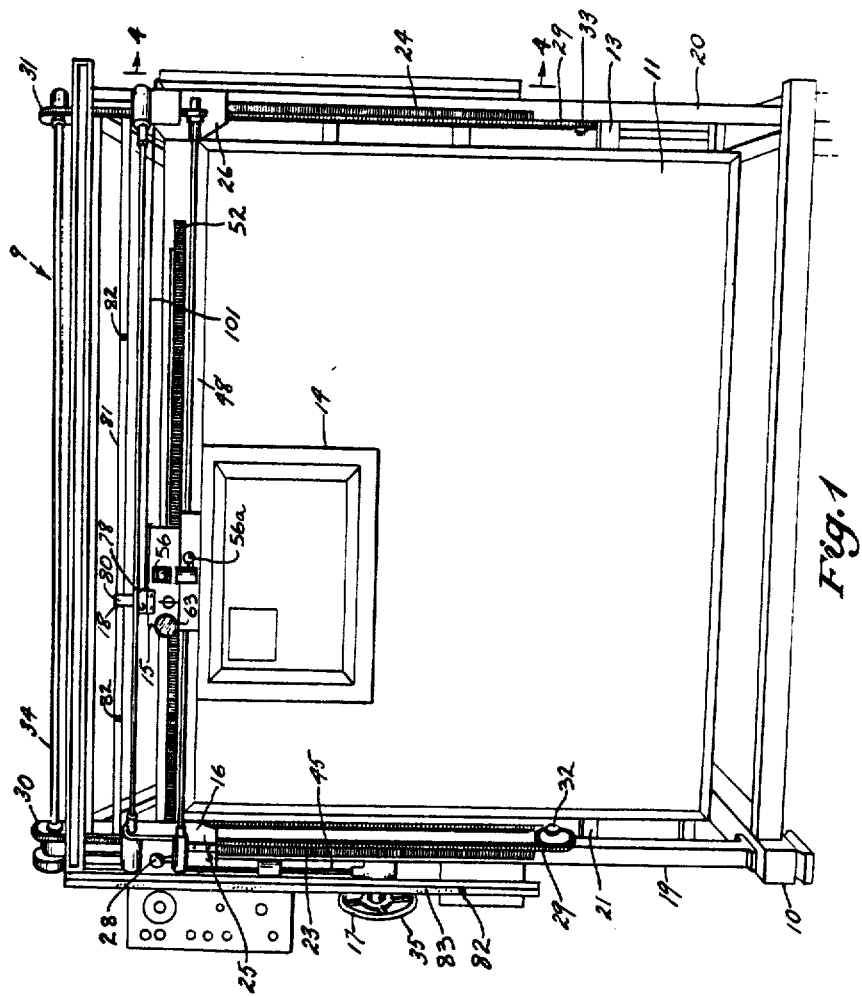
FIG. 1 is a front perspective view of an embodiment of the invention.

In accordance with the invention, FIG. 1 shows the device generally indicated by reference character 9, which comprises broadly: a base 10, a lithographic plate support element 11, mounting means 13 for positioning the support element 11, a negative carrier support 14, horizontal registering means 15, vertical registering means 16, means 17 to vertically move the horizontal registering means, and programming means 18. Supported from the base 10 is a negative carrier illumination means (not shown) similar to that disclosed in U.S. Pat. No. 3,484,166, and eliminated from the drawing for purposes of clarity. This patent is incorporated herein by reference.

The base 10 is possessed of sufficient weight and rigidity to form a stable foundation for the device. Projecting perpendicularly upward from the base are a pair of uprights 19 and 20. Secured between the uprights 19 and 20 are a plurality of struts 21 forming the mounting means 13.

Figure 3:
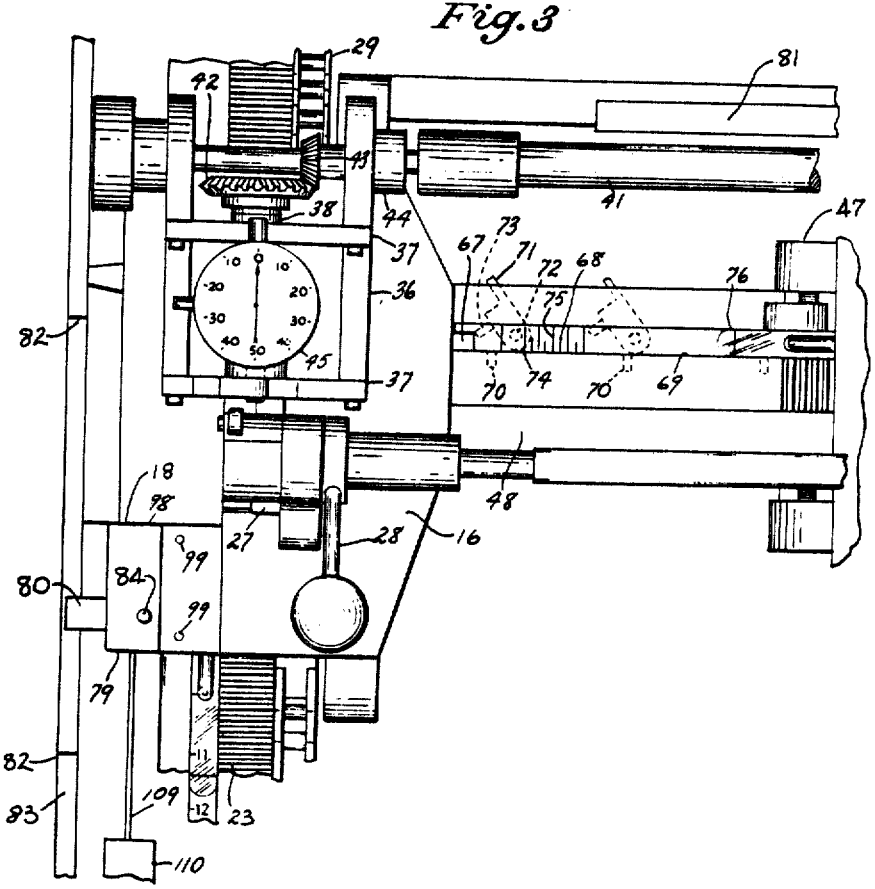
FIG. 3 is a fragmentary view in elevation showing a corresponding vertical axis adjustment means.

As seen in FIGS. 1 and 3 the vertical registering means 16 includes a pair of racks 23 and 24 which are substantially identical, and in horizontal alignment. Slideably disposed on said racks are a pair of housings 25 and 26. Overlying the racks 23 and 24 are short rack sections 27 which are completely complementary to the racks, so that with relatively light pressure, the rack sections will properly seat or mesh with the racks to immobilize the housings with respect thereto. The rack sections 27 are moved toward and away from the racks 23 and 24 in a manner disclosed in the above-mentioned U.S. Pat. No. 3,484,166 using an operating lever 28.

The housings 25 and 26 are connected to one point on angular chains 29, which ride on upper sprockets 30 and 31, and lower sprockets 32 and 33. A counterweight (not shown) is mounted on each of the chains 29 to substantially offset the weight of the means 16. The upper sprockets 30 and 31 are fixed on a transverse upper shaft 34 journaled on the ends of the uprights 19 and 20, respectively. One end of the shaft 45 is connected by a pair of bevel gears (not shown) to be operated by a handwheel 35. Thus, when the lever 28 is in its neutral position, wherein both rack sections 27 are disengaged, rotation of the handwheel moves the shaft 45 and the housings 25 and 26 up or down to a desired approximate position (as for example to a position within one-eighth inch of the ultimately desired position). Moving the lever 28 up or down will then force one or the other of the rack sections into the racks, and when the parts are fully interengaged, they will be disposed precisely at a predetermined position.

To obtain still closer adjustment on the order of the nearest one-thousandth of an inch, the housings 25 and 26 include auxiliary frame elements 36 arranged for rectilinear movement with respect thereto. The frame elements support a pair of trunnions 37 and a stub shaft 38. The shaft engages a transverse shaft 41 to transmit motion to a corresponding shaft (not shown) on the oppositely disposed housing. The stub shaft 38 mounts a bevel gear 42 which transmits motion to a bevel gear 43 and subsequently to shaft 41 via end thrust nut 44. The motion of stub shaft 38 also drives a micrometer gauge 45, the operation of which is more fully set forth in U.S. Pat. No. 3,484,166.

The horizontal registering means 15 includes a rectangularly shaped members 47 (FIG. 2) supported upon a transverse beam 48 by rollers 49. Rack sections 50 and 51 selectively co-act with a rack 52, and are supported for pivotal movement by pin 53 which provides a pivotal axis in a member 54 which remains fixed with respect to the rack 52 when either rack section is engaged therewith. A pair of corresponding cam rollers, one of which is indicated by reference character 55, are both mounted on a pivotally mounted cam member 55a operated by a shift lever 56. A horizontally adjustable plate 57 is supported in position between upper and lower guides 58 and 59, respectively, the plate being formed integrally with the members 50 and 51, and mounting an eccentric 60 on a shaft 61. The cam includes a manually engageable member 62 for rotation thereof, the eccentric cam surface bearing against the surface of a circular bore in a follower plate integral with the member 47. Thus, with rotation of the cam 60, minute adjustment of the member 47 along the transverse beam 48 is possible. A micrometer gauge 63 is connected to an operating pintle 64, and is fixed with respect to the member 57 so as to indicate movement of the member 47. A lock nut 65 bears upon the shaft 61, and prevents rotation in those applications where minute horizontal adjustment is not required. The nut 65 is provided with a manually engageable member 66 extending therethrough to facilitate loosening and tightening thereof. The negative carrier support 14 is secured to the lower portion of the member 47, and thus moves horizontally therewith. From a consideration of FIG. 2, it will be apparent that a simple mode of operations includes the locating of the member 47 by first locking the same using the shift lever 56 and the subsequent rotation of the cam 60 while reading horizontal displacement on the gauge 63 to the precision desired. Shift lever 56a is employed to move carrier 14 in and out against the plate disposed on support element 11.

Referring again to FIG. 3 in the drawings, the transverse beam 48 is provided with a horizontally arranged groove or track 67, in which there is disposed an elongated scale member 68. Preferably, the track 67 is of rectangular cross section including a lower wall 69 provided with a plurality of small vertically or laterally arranged bores 70, spaced from each other in equal increments, as for example, 1-inch intervals. The leftward end of the scale member 68 is provided with a pivotal locking member 71 mounted on a pintle 72, and having a projection 73 selectively engageable in one of the bores 70. Rightwardly of the pintle 72 is an index (a point of zero measurement) 74, and subsequent graduations 75. Extending leftwardly from the member 47 is a corresponding index member 76 alignable with the graduations 75.

While the scale member 68 will normally be positioned with the pintle 72 engaged in the leftwardmost bore 70, in certain types of copy, it may be desirable to arrange the leftward margin inwardly from the normal leftward edge of the plate support element 11. When such is the case, the locking member is manually pivoted out of an engagement with the leftwardmost bore, and the scale member slid rightwardly to the desired location, following which the locking member is again engaged within another bore. With a new reference point established, the member 47 may be moved with relation thereto without the necessity of making a mental addition to each measurement made on the scale member. This arrangement facilitates the use of different size negative carriers.

The programming means 18 serves the purpose of simplifying making serial adjustments to the same predetermined position. While the above-described scale may be used for the particular value thereon is known, which corresponds to the desired position, each time the same position is established, the scale must be viewed in order to establish this position. The means 18 provides an automatically actuated indication upon the arrival of the negative carrier support element at the proper location, both with respect to horizontal and vertical axis of movement. To this end, the means 18 comprises a horizontal axis adjustment element 78 and a vertical axis adjustment element 79.

The element 78 includes a preferably transparent extended bar or strip 81, the axis of which is parallel to that of the rack 52.

Likewise, strip 83 is parallel to rack 23. These strips 81 and 83 are removably mounted in their indicated positions. They are preferably transparent and each bear at least one opaque indicia on their face. The easy removability of such strips allows them to be prepared off the machine and allow jobs to be pre-setup.

Mounted upon the frame of elements 78 and 79 are optical interruptor element 80. These are generally U-shaped switches connected to the appropriate circuitry so as to light an indicator lamp when a predetermined coordinate position on the strip has been reached. In operation the interruption comprises a light emitting diode and a responsive light receptor. The interruptor travels horizontally or vertically upon the elements 78 or 79 in such a manner that a transparent strip 81 and 83 passes in the groove of the U-shaped interruptor. When the opaque portion 82 of the strip is reched, there is light interference in the groove of the interruptor and the circuitry responds by lighting indicator lamp 84 or 85. Obviously these indicia can be opaque marks on a transparent strip or holes on an opaque strip or any other variation as long as an optical density difference can be noticed.

Figure 2:
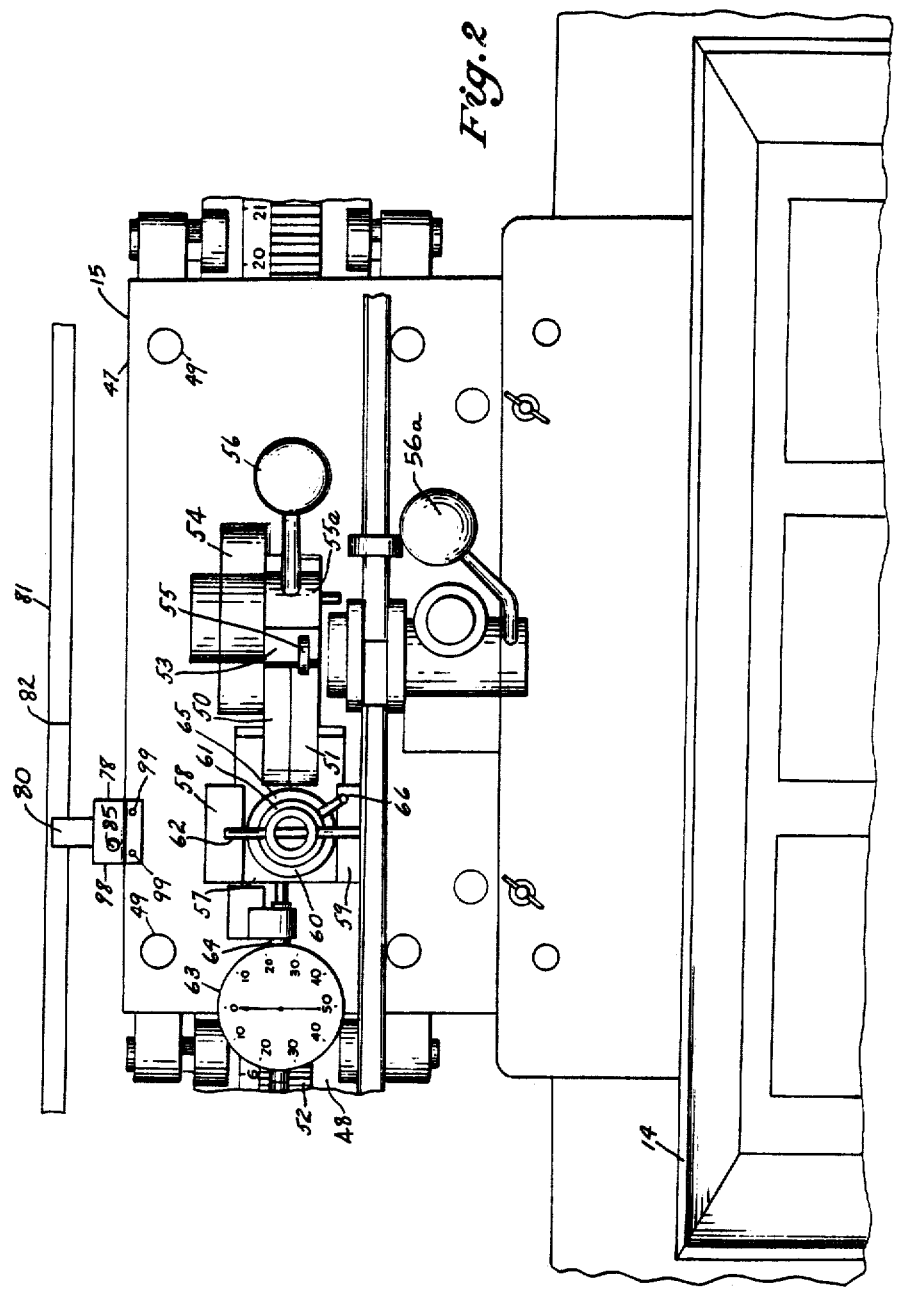
FIG. 2 is a fragmentary enlarged front elevational view of a chase or negative support incorporating a horizontal axis adjustment means.

The lamp bearing elements 98 are mounted by screws 99, as best seen in FIGS. 2 and 3. The element 98 includes a lamp connected in series with an extensible power cord 109 cooperating with an elongated housing 110 which retracts the cord as the negative carrier is lowered.

Figure 4:
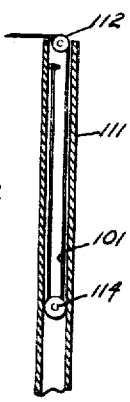
FIG. 4 is a view in elevation showing self-operative means for storing a power cord used in conjunction with signalling means forming a part of the disclosed embodiment.

Referring to FIG. 4 in the drawings, there is illustrated a schematic view of the elongated horizontal power cord housing 111 which retracts the power cord 101. The housing is mounted in fixed vertical relation upon the base 10, and includes an open upper end having a pulley 112 tangent to one edge of the opening thereof. Disposed within the hollow interior is a weighted roller 114 which engages a medial part of the cord 101. From a consideration of this figure, it will be clear that as the cord is retracted, the weight of the roller draws a looped segment thereof into the interior of the housing, thereby preventing the cord from becoming tangled with to and fro movement of the negative carrier along a horizontal axis. The cord 109 is retracted within the housing 110 in a similar manner, with the exception that the housing 110 does not require structure corresponding to the pulley 112.

Figure 5:
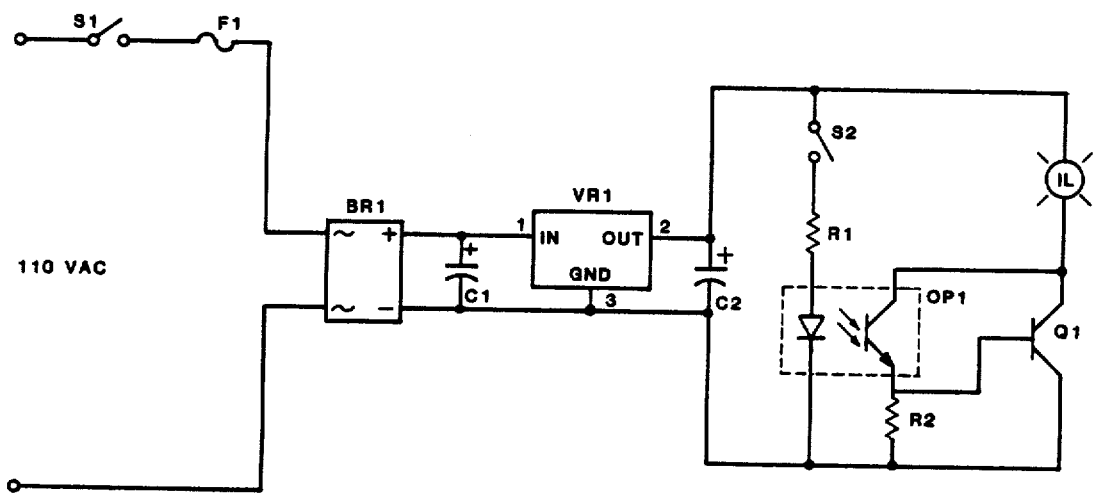
FIG. 5 is a view of an individual circuit closing means forming a part of the embodiment.

FIG. 5 describes an optical interruptor circuit which is responsive to the indicia on strips 81 and 83.

The preferred circuit employs 110 volt A.C. incoming line current which enters via switch S1 and ¼ amp fuse F1. The alternating current is rectified by 1 amp bridge rectifier BR1, the output terminals of which input a three terminal 1-amp regulator VR1 across capacitor C1 rated at 1000 microfarads at 25 volts D.C. as shown. The output of the regulator is connected across capacitor C2 rated at 100 microfarads at 16 volts D.C. Current is introduced to optical interruptor OP1 via switch S2 and resistor R1 rated at 510 ohms at ½ watt. The optical interruptor is preferably a model OPB820 available from the TRW Optron division of TRW, Inc. located in Carrollton, Texas. The interruptor is then connected as shown to resistor R2 rated at 100K ohms at ¼ watt and power Darlington transistor Q1, such as ECG 261 from Sylvania, with $H_{FE}$ 500 or greater, $E_c = 0.5$ amp and $V_{CE} = 12$ volts. Indicator lamp IL is positioned as shown. Obviously various circuit modifications will be apparent to the skilled artisan.

Figure 6:
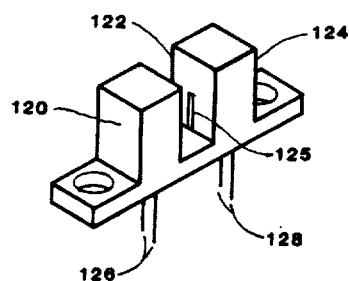
FIG. 6 describes a monolithic optical interruptor useful for the present invention.

FIG. 6 shows a monolithic optical interruptor having a light emitter 120, groove 122 and light receptor 124 with inlet 125, and appropriate connecting leads 126 and 128.

During operation, the machine is "set up" for repeated cyclic operation by determining the positions of successive exposures on a single lithographic film or plate. This operation will normally require movement of the negative carrier in a serial fashion to several positions along a horizontal axis. As these positions are determined, individual indicia 82 are positioned along the strips 81 and 83 in such manner that the circuit through the lamp element 98 is closed, as indicated by illumination of the lamp. A similar operation is carried out for the vertical axis adjustment element, resulting in the locating of a plurality of corresponding indicia. Once the program has been established, repeated exposures may be interrupted at any time without distributing this program, as for example, where a single non-related exposure is required, following which a return to programmed operation may be made. In making successive exposures, the operator need only initially align the vertical axis adjustment element to its uppermost position, and move the negative carrier rightwardly as seen on FIG. 1, stopping for an exposure each time the lamp is illuminated. When the rightwardmost position has been reached, the negative carrier is adjusted so that the next lower position on the vertical axis adjustment element is illuminated, and the cycle along the horizontal axis adjustment element is repeated.

It is within contemplation that the invention may be used in arts other than lithography where a workpiece must be precisely located in a plane. Examples include drafting boards and uses for quality control checks such as in the manufacture of printed circuit boards.

I wish it to be understood that I do not consider the invention limited to the precise details of structure shown and set forth in this specification, for obvious modifications will occur to those skilled in the art to which the invention pertains.

What is claimed is:

1. A device for precision planar positioning which comprises:
   (a) a generally planar frame; and
   (b) a cursor; and
   (c) means for translating said cursor across the face of said planar frame and fixing said cursor at any of a plurality of positions; and
   (d) a planar indicator strip removably fixed along each of two adjacent perpendicular edges of said frame, each strip bearing at least one facial indicia having a substantially different optical density from said strip; and
   (e) at least one optical interruptor means, cooperating with said translating means, capable of differentiating between the optical density of said strips and said indicia and having means for indicating a difference in optical density between said strips and said indicia.

2. A photographic element exposing device comprising:
   (a) a photographic element support; and
   (b) a carrier support for a photomask movable in a plane substantially spaced from and parallel to said photographic element support; and
   (c) means for adjusting the position of said carrier support with respect to said element support; and
   (d) means for indicating the adjustment of said negative carrier support to a pre-determined location comprising:
      (i) a planar indicator strip removably fixed along each of two adjacent perpendicular edges of said photographic element support, each strip bearing at least one facial indicia having a substantially different optical density from said strip; and
      (ii) at least one optical interruptor means, cooperating with said adjusting means, capable of differentiating between the optical density of said strips and said indicia and having means for indicating a difference in optical density between said strips and said indicia.

3. The device of claim 1 or 2 wherein said optical interruptor means comprises a light source and a light receptor spaced from said source which is capable of receiving light from said source, said light receptor being capable of signalling the presence or absence of light reception from said source.

4. The device of claim 3 wherein said signal is capable of triggering an indicator display.

5. The device of claim 4 wherein said indicator display is a lamp.

6. The device of claim 3 wherein said optical interruptor means is monolithic.

* * * * *